US006608645B2

(12) United States Patent
Kunitake

(10) Patent No.: US 6,608,645 B2
(45) Date of Patent: Aug. 19, 2003

(54) FUNNEL FOR CATHODE RAY TUBE

(75) Inventor: Toshio Kunitake, Otsu (JP)

(73) Assignee: Nippon Electric Galss Co., Ltd., Shiga-Ken (JP)

( * ) Notice: Subject to any disclaimer, the term of this patent is extended or adjusted under 35 U.S.C. 154(b) by 0 days.

(21) Appl. No.: 10/099,154

(22) Filed: Mar. 13, 2002

(65) Prior Publication Data

US 2003/0030363 A1 Feb. 13, 2003

(30) Foreign Application Priority Data

Mar. 14, 2001 (JP) ....................................... 2001-072286

(51) Int. Cl.[7] ............................ H04N 3/20; H01J 17/16

(52) U.S. Cl. ....................................... 348/173; 313/634

(58) Field of Search ................................ 313/404, 407, 313/440, 477 R, 634, 476; 348/173, 284, 325, 379

(56) References Cited

U.S. PATENT DOCUMENTS

| | | | | |
|---|---|---|---|---|
| 5,258,688 A | | 11/1993 | Fondrk | 313/477 R |
| 5,751,103 A | | 5/1998 | Opresko et al. | 313/477 R |
| 5,929,559 A | * | 7/1999 | Sano et al. | 313/477 R |
| 6,323,591 B1 | * | 11/2001 | Oosterhout et al. | 313/477 R |
| 6,335,588 B1 | * | 1/2002 | Kim et al. | 313/402 |
| 6,359,379 B1 | * | 3/2002 | Lee et al. | 313/477 R |

FOREIGN PATENT DOCUMENTS

| | | |
|---|---|---|
| DE | 10025780 A1 | 12/2001 |
| EP | 0369770 A1 | 5/1990 |
| GB | 2342496 A | 4/2000 |
| JP | 2002-63858 | 6/2002 |
| WO | WO 99/46795 A | 9/1999 |

* cited by examiner

*Primary Examiner*—Don Wong
*Assistant Examiner*—Minh Diu A
(74) *Attorney, Agent, or Firm*—J.C. Patents

(57) ABSTRACT

In the funnel for use in cathode ray tubes, the thickness of the region ranging from the major axis L to the diagonal axis D is made substantially uniform by keeping the difference in thickness between the regions on the major axis L and the diagonal axis D within 0.3 mm. Another substantially uniform thickness region is formed in the region ranging from 90°−(d+α)° to the minor axis S by keeping the difference in thickness from the minor axis S within 0.3 mm. The thickness of the region on the major axis L is the same as the conventional one. Then the weight of the funnel can be reduced without sacrificing its mechanical strength.

14 Claims, 4 Drawing Sheets

FUNNEL FOR CATHODE RAY TUBE

BACKGROUND OF THE INVENTION

This invention relates to a weight reduction of a funnel for a cathode ray tube used in TV receivers.

In general, a cathode ray tube for use in the TV receiver has a front panel portion, a backward funnel portion and a neck portion incorporating an electron gun. Referring now to FIG. 3A and FIG. 3B, the funnel portion comprises a yoke portion a at the smaller open-end side and a body portion b at the larger open-end side. The cross-section of the body portion b perpendicular to its centerline X has a substantially rectangular shape having the major axis L, the minor axis S and the diagonal axis D.

In the conventional funnel F' for the cathode ray tube, which is T(Lh), T(Sh) and T(Dh) in thickness along the major axis L, the minor axis S and the diagonal axis D at an arbitrary height h, there is a relation, T(Sh)<T(Lh) <T(Dh), in general. Conventionally, the thickness of each region has been determined (see FIG. 4) according to T(θh), for example in the first quadrant of 0≦θ≦90°, so that $T(\theta h)=T(Lh)+(T(Dh)-T(Lh))\sin^2((90°\times\theta)/d°)$ in the L(0°)≦θ≦D (d°) region, while $T(\theta h)=T(Sh)+(T(Dh)-T(Sh))\sin^2((90°\times(90°-\theta))/(90°-d°)$ in the D(d°)≦θ≦s(90°) region.

The thickness distributions in the second (90°≦θ≦180°), third (180°≦θ≦270°) and fourth (270°≦θ≦360°) quadrants have been determined following the above two equations to present a symmetric thickness distribution.

On the other hand, the weight of the cathode ray tube increases as the size of the TV receiver increases. It becomes thus necessary to reduce its weight for easier transport and handling. For weight reduction, the cathode ray tube should be made thinner. However, if its thickness is simply reduced, its mechanical strength deteriorates and will not meet the requirements for safety.

If the thickness is simply reduced, the moldability deteriorates as well. That is, the funnel for the cathode ray tube is manufactured by press molding, namely, by charging a predetermined amount of molten glass (hereafter, gob) in a bottom mold and then pressing a plunger against the gob in the bottom mold. When the gob is pressed by the plunger, it extends into the gaps between the bottom mold and the plunger until the top end of the molten glass reaches the shell mold that is prepared to form the larger open-end of the funnel. During this process of pressing, since the minor axis side and the major axis side of the funnel body are away from the centerline at different distances, the times for molten glass to reach from the major axis side and the minor axis side to the larger open-end through the gaps between the bottom mold and the plunger are different from each other. That is, it takes more time for the glass to reach the larger open-end from the major axis side than from the minor axis side.

In general, as described above, the molten glass on the minor axis side first reaches the larger open-end and then the glass on the major axis side is extended to the larger open-end. Thus the glass on the minor axis side, which has already reached the larger open-end, receives an excessive force that may cause cracks. Since it takes more time for glass extension on the major axis side than on the minor axis side, the temperature of glass is likely to fall on the major axis side and wrinkles may be produced in the vicinity of the larger open-end. Meanwhile, if the pressing force is lowered to prevent cracks on the minor axis side, the glass may not reach the larger open-end completely and dents (unfilled portions) may be left in the extended glass.

Such molding defects like crack, wrinkle and dent are produced even when the aspect ratio is 4:3, if one tries to simply reduce the thickness of the funnel body. When the aspect ratio is larger, for example, 16:9, this phenomenon becomes more apparent.

SUMMARY OF THE INVENTION

It is, therefore, an object of the present invention to provide a funnel for a cathode ray tube that will lead to reduced weight with no deterioration in mechanical strength or moldability.

To attain the above object, the present invention provides a funnel for a cathode ray tube comprising a yoke portion at a smaller open-end side and a body portion at a larger open-end side. In this funnel, an arbitrary transverse cross-section (Ph) perpendicular to a centerline X of the body portion is substantially rectangular having a major axis L, a minor axis S and a diagonal axis D. With the transverse cross-section (Ph) being virtually divided into four 90°-quadrants around the center line X, a thickness distribution for at least one of the quadrants is provided by |T(Dh)−T(Lh)|≦0.3 mm and T(Dh)>T(Sh), |T(θh)−T(Lh)|≦0.3 mm and |T(θh)−T(Dh)|≦0.3 mm in the 0°≦θ≦d° region, and |T(θh)−T(Sh)|≦0.3 mm in the (d+α)°≦θ≦90° region where 0°<α<(90−d)°; where θ (0≦θ≦90°) is an angle measured from the major axis L in each quadrant, T(Lh) is a thickness of the region on the major axis L(θ=0°), T(Sh) is a thickness of the region on the minor axis S(θ=90°), T(Dh) is a thickness of the region on the diagonal axis D(θ=d°), and T(θh) is a thickness of the region at an arbitrary angle (θ). The arithmetic symbol "||" represents the absolute value.

Since the thickness of the funnel of the region on the major axis L is the same as that of the prior art, there is no decrease in mechanical strength. In the thickness configuration according to the present invention, the thickness is maintained substantially uniform over the region extending from the major axis L through the diagonal axis D by keeping the difference in thickness between the regions on the major axis L and on the diagonal axis D within 0.3 mm, and further the thickness of the region extending from 90°−(d+α)° through the minor axis S is maintained substantially uniform by keeping the difference in thickness from the region on the minor axis S within 0.3 mm. Then it becomes possible to reduce the funnel weight. The smaller the above α is, the more the above uniform thickness region may expand. As a result, the funnel becomes further lighter.

In the above configuration of the present invention, it is allowed that T(Dh)−T(Sh)≧0.8 mm. As described earlier, the time required for glass extension on the major axis side differs from that on the minor axis side when forming the funnel. However, if the thickness on the major axis L is made larger at least 0.8 mm than that on the minor axis S, the glass extension on the major axis side is accelerated and thus the delay in arriving time of glass extending from the major axis side to the larger open-end becomes smaller. As a result, molding defects such as crack, wrinkle and dent are prevented, and there is no deterioration in moldability. This thickness design is particularly effective to the funnel of the cathode ray tube where the aspect ratio is large, 16:9, and the difference in distance from the major axis and the minor axis is large.

In the present configuration, the angle, α, can be 10°≦α<(90−d)°. If α is 10° or smaller, it becomes difficult to make a gradual decrease in thickness from the thickness T(Dh) on the diagonal axis to the thickness T(Sh). As α approaches (90−d)°, the funnel becomes lighter. Thus the angle α should be as small as possible within the (90−d)° range.

DETAILED DESCRIPTION OF THE PREFERRED EMBODIMENTS

Now the embodiments of the present invention will be described below with reference to the accompanying drawings.

Figure 1A:
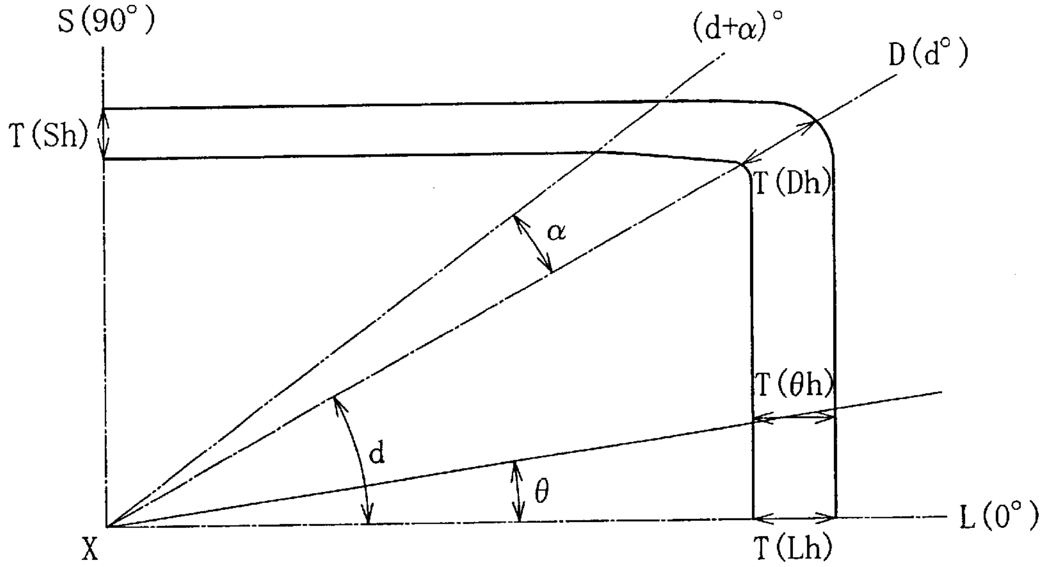
FIG. 1A is a cross-sectional plan view of a 90° portion (first quadrant) of a funnel for a cathode ray tube at a position of an arbitrary height h measured from the reference line, depicted for the purpose of explaining the thickness distribution in the present invention.
Figure 1B:
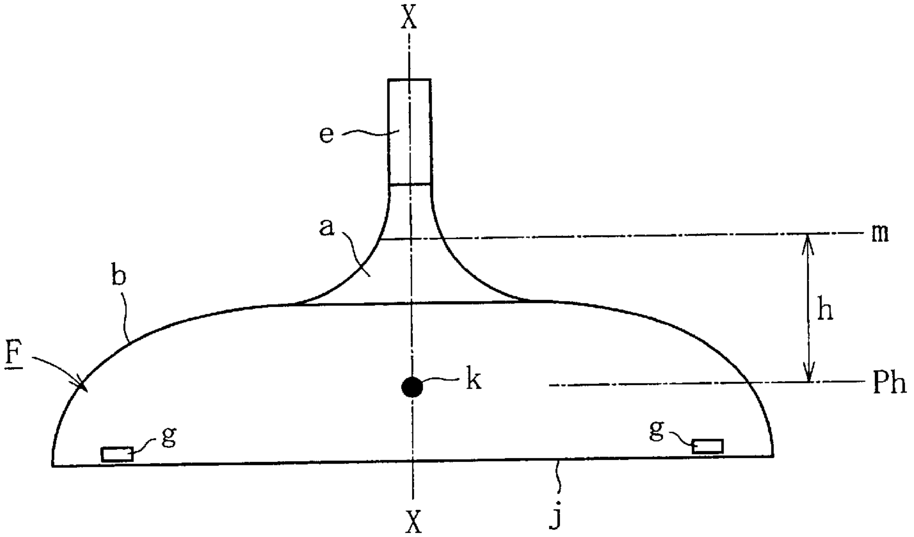
FIG. 1B is a side view of the whole funnel.
Figure 2:
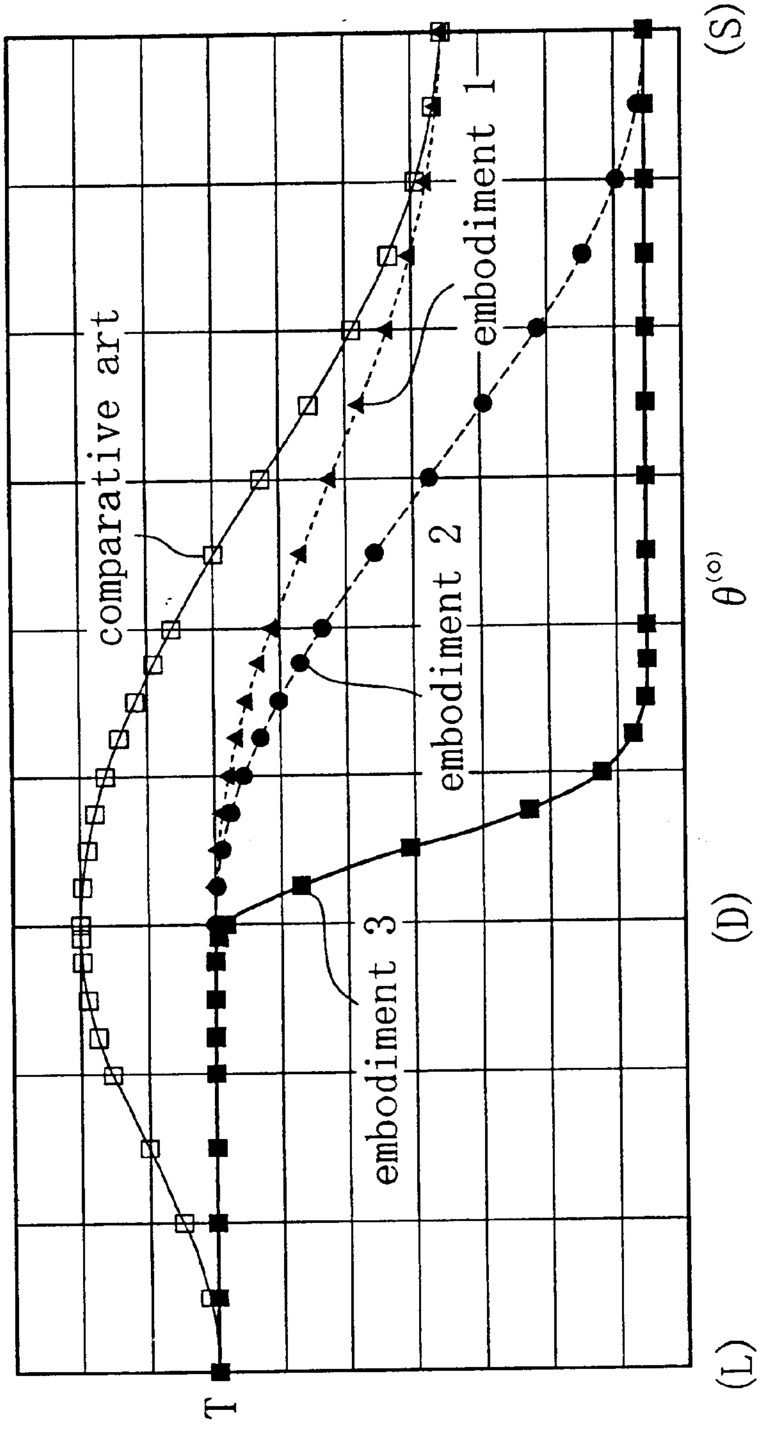
FIG. 2 is a graph showing an example of a thickness distribution in the 90° portion of the funnel (first quadrant) according to the present invention.
Figure 3A:
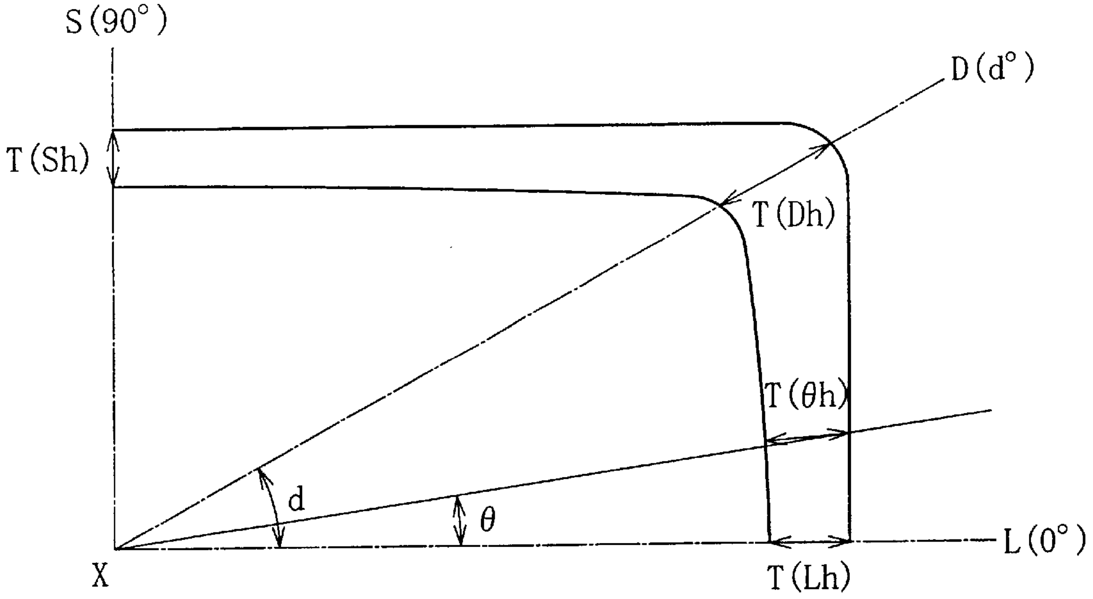
FIG. 3(A) (PRIOR ART)
FIG. 3A is a cross-sectional plan view of a 90° portion (first quadrant) of a funnel for a cathode ray tube at a position at an arbitrary height h from the reference line, depicted for the purpose of explaining the thickness distribution in the prior art.
Figure 3B:
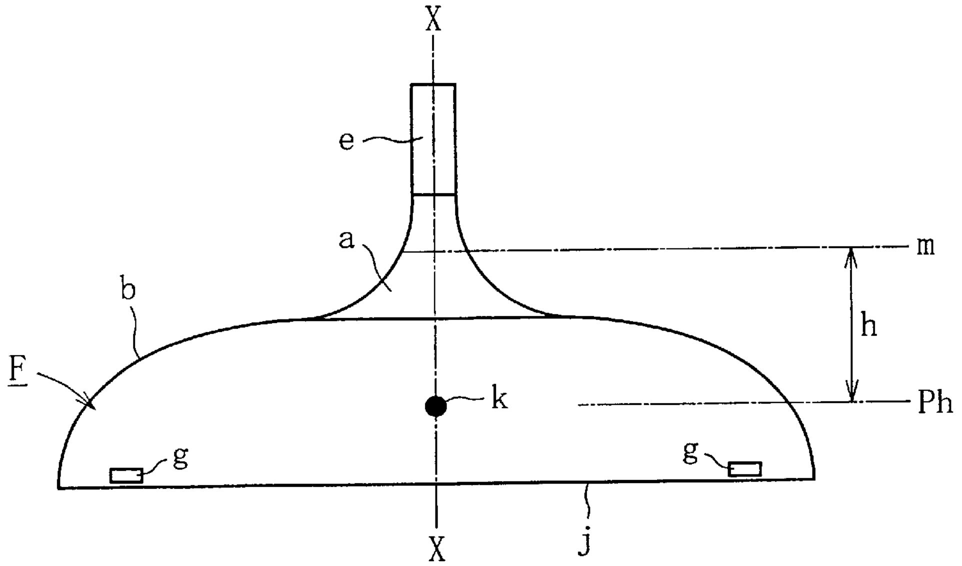
FIG. 3(B) (PRIOR ART)
FIG. 3B is a side view of the whole funnel.
Figure 4:
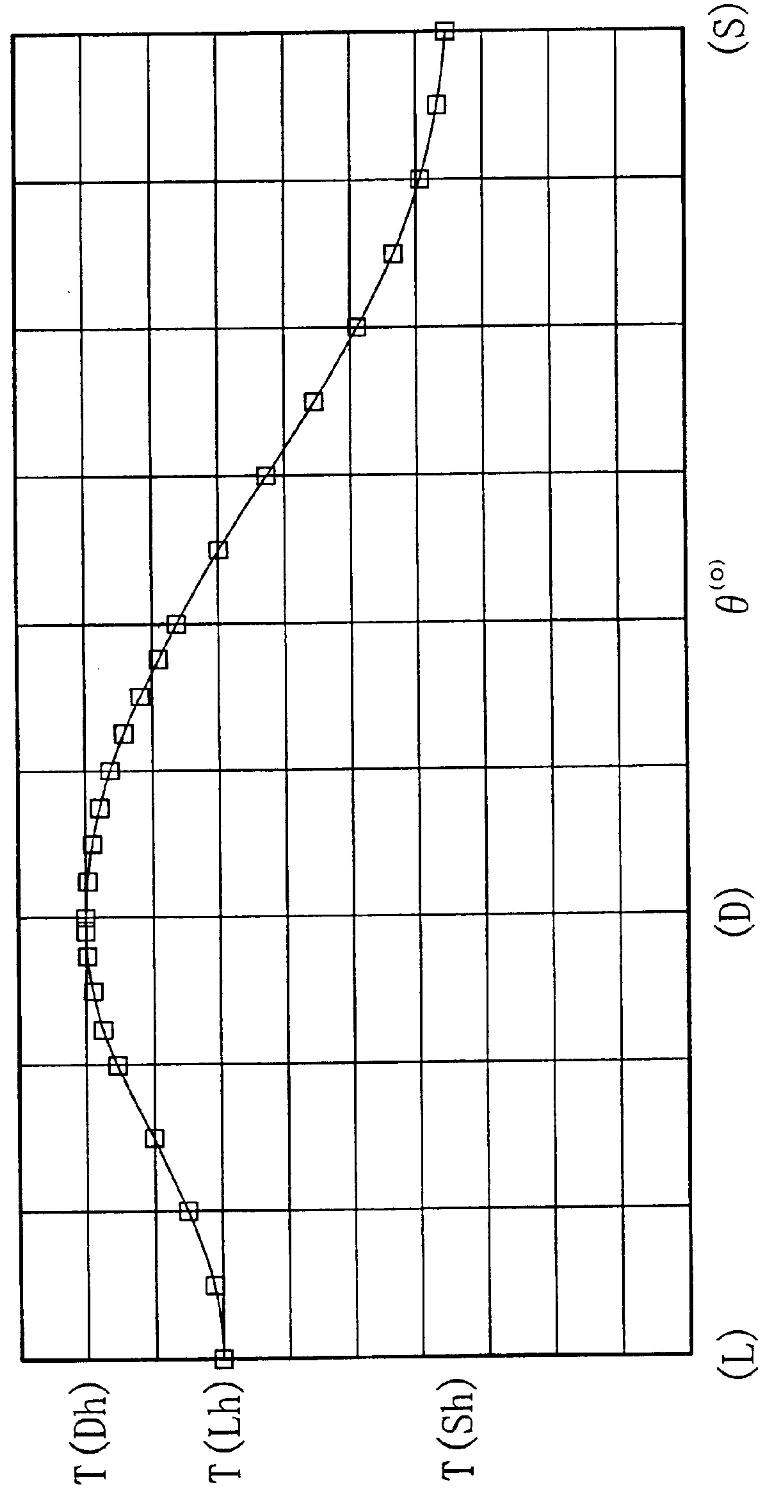
FIG. 4 (PRIOR ART)
FIG. 4 is a graph showing an example of a thickness distribution in the 90° portion of the funnel (first quadrant) according to the prior art.

FIG. 1A is a cross-sectional plan view of a 90° portion (first quadrant) of a funnel for a cathode ray tube at a position of an arbitrary height h measured from the reference line, depicted for the purpose of explaining the thickness distribution proposed by the present invention. FIG. 1B is a side view of the whole funnel. FIG. 2 is a graph showing examples of the thickness distribution in the 90° portion of the funnel (first quadrant) according to the present invention.

Referring now to FIG. 1A and FIG. 1B, the funnel F for the cathode ray tube comprises a yoke portion a at a smaller open-end side and a body portion b at a larger open-end side. The cross-section of the body portion b perpendicular to the centerline X is substantially rectangular having the major axis L, the minor axis S and the diagonal axis D. At positions of an arbitrary height h measured from the reference line m, the thickness of the body portion b excluding the neck portion e, yoke portion a, seal edge portion j, anode button portion k and alignment portion g is set as below.

Namely, representing the respective thicknesses of regions on the major axis L ($\theta=0°$), the minor axis S ($\theta=90°$) and the diagonal axis D ($\theta=d°$) with T(Lh), T(Sh) and T(Dh), and representing the thickness of a region at angle $\theta$ with T($\theta$h), then T(Dh) is larger than T(Sh) and $|T(Dh)-T(Lh)|\leqq 0.3$ mm. When $0°<\alpha<(90-d)°$ as shown in FIG. 1A, a uniform thickness region characterized by $|T(\theta h)-T(Lh)|\leqq 0.3$ mm and $|T(\theta h)-T(Dh)|\leqq 0.3$ mm is formed over the $0°\leqq\theta\leqq d°$ range. At the same time, another uniform thickness region characterized by $|T(\theta h)-T(Sh)|\leqq 0.3$ mm is formed in the $(d+\alpha)°\leqq\theta\leqq 90°$ range, and a thickness decreasing region where the thickness decreases gradually from T(Dh) to T(Sh) is formed over the range from the diagonal axis D to $\theta=(d+\alpha)°$. This thickness distribution is adopted in the other regions consisting the funnel F, namely, the regions of $90°\leqq\theta\leqq 180°$ (second quadrant), $180°\leqq\theta 270°$ (third quadrant) and $270°\leqq\theta\leqq 360°$ (fourth quadrant).

In the above case, it is preferable to control the thickness distribution at an arbitrary height h in the funnel body portion b so that the thickness distribution in the first quadrant ($0°\geqq\theta\leqq 90°$) is also realized in the other second to fourth quadrants symmetrically with respect to both major axis L and minor axis S. Then the effect of weight reduction can be maximized, and the weight distribution of the funnel F becomes symmetric with respect to any point at an arbitrary height h on the centerline. As a result, the funnel glass can be molded with a desired thickness distribution with high precision at high reproducibility, and it becomes much easier to maintain the mechanical strength of the funnel.

The neck portion e, yoke portion a, seal edge portion j, anode button portion k and alignment portion g are excluded form the target regions of the present invention because of the following reasons. The neck portion e, which is a part incorporating an electron gun, is made into a tube of a uniform thickness. The yoke portion a is a part expanding from the neck portion e to the body portion b and has a deflection yoke coil on its outer periphery for deflecting the electron beams emitted from the electron gun. The thickness of the yoke portion a is gradually increased toward the body portion b along the centerline X. In general, the thickness of the cross-section perpendicular to the centerline X is uniform around the centerline X. The seal edge portion j is a part faced with the panel portion (not shown) and made uniform in thickness. The anode button portion k is made a little thinner than the other regions to allow the implantation of an anode button. The alignment portion g is formed to project from the outer surface of the funnel F in the vicinity of the seal edge j of the funnel F. Two or more alignment portions g are formed to serve as reference spots for positioning when fabricating a glass bulb by coupling the funnel and the panel for the cathode ray tube with a sealer. The reference planes for positioning are away from the centerline X at a predetermined distance and perpendicular to the seal edge plane. Thus each alignment portion g is thicker than the other regions as much as it projects from the funnel F.

For the confirmation of the effects provided by the present invention, cathode ray tubes were fabricated according to the embodiments of the invention and to examples for comparison based on the following specifications, as shown in Table 1.

1. Diagonal size 32 inches (aspect ratio (horizontal to vertical) 16:9), deflection angle 102°, flat bulb (flat cathode ray tube)
2. Diagonal size 36 inches (aspect ratio (horizontal to vertical) 16:9), deflection angle 106°, flat bulb (flat cathode ray tube)

The weights of those cathode ray tubes were compared, and strength tests based on the ball impact method and missile method complying with UL1418 (Portioned State Safety Standards) were also carried out for comparison of strength. According to the missile method, a 10 cm-long scratch is made with a diamond cutter on each of the upper and lower positions on the longer frame side in the vicinity of the edge of the effective screen area of the panel face portion, and then a missile-shaped steel piece hits the panel face portion so that an energy up to 20 Joule is applied to the panel face portion. When the cathode ray tube is destructed by the impact shock, the pass/fail is determined based on the size of the scattered glass fragments. Meanwhile, in the ball impact method, a 50 mm-diameter steel ball hung at the end of a pendulum is swung to drop with an energy of 7 Joule onto the effective screen area of the panel face portion, and the pass/fail is determined based on the size of the scattered glass fragments.

The cathode ray tubes of the above embodiments were fabricated to have the thickness distribution in accordance with the present invention, while those of the comparative examples were fabricated to have the thickness distribution in accordance with the prior art. The thickness T(Lh) of the region on the major axis L at a height h in the embodiments was the same as that of the corresponding region in the comparative examples. Both in the embodiments and the comparative examples, the funnel thickness distribution over the first quadrant through the fourth quadrant was made symmetric with respect to both the major axis and the minor axis crossing the centerline of the almost rectangular cross-section of the body portion at an arbitrary height h. In the first, second, fourth and fifth embodiments, $\alpha=60°$, while in the third and sixth embodiments, $\alpha=16°$.

The panel for the cathode ray tube (not shown), which is air-tightly coupled with the funnel F (or F') to form a bulb, had the specifications common in the embodiments and comparative examples, for the respective tests of the 32 inches and 36 inches size tubes.

The black triangles, black circles and black squares in FIG. 2 represent the thickness distributions in the embodiments according to the present invention, while the white squares represent the thickness distribution in a comparative example according to the prior art. For example, if the distance between the reference line m and the seal edge j is H in the direction of the center line X, the thicknesses (in mm) at heights of h=(½)H and h=(¾)H become those listed on Table 1 for the respective diagonal sizes of 32 inches and 36 inches.

The results of comparison are also shown in Table 1. As indicated in Table 1, the weight of the funnel was reduced 3.3%, 5.8% and 10.8% in the embodiment-1, the embodiment-2 and the embodiment-3, respectively, compared with the comparative example-1, for the case of 32 inches in diagonal size. For the case of 36 inches in diagonal size, the funnel weight was reduced 3.5%, 5.9% and 10.0% in the embodiment-4, the embodiment-5 and the embodiment-6, respectively, compared with the comparative example-2.

In the tests of strength, there was no result out of specification as shown in Tables 2 and 3, either in the embodiments and the comparative examples. The test results indicate that the weight of the funnel can be reduced without sacrificing its mechanical strength according to the present invention. Note that the differences between the black symbols and the white ones represented by the black triangles, black circles, black squares and white squares correspond to the decrease in thickness attained by this invention. During the formation of funnels for the above embodiments, there were no molding defects such as crack, wrinkle or dent, or deterioration in moldability.

Although the aspect ratio was 16:9 in the above embodiments and comparative examples, the present invention is effective on the funnels of other aspect ratios. When the aspect ratio is 16:9, the angle d of the diagonal axis D becomes 29.35°, while the specific angle d of the diagonal axis D becomes at 36.87° when the aspect ratio is 4:3.

TABLE 1

| | Diagonal size | Position for Thickness Measurement | S | L | D | α | Funnel Weight |
|---|---|---|---|---|---|---|---|
| Embodiment | 32 inches | ½ H | 6.5 | 7.2 | 7.2 | 60° | 11.6 |
| 1 | | ¾ H | 7.8 | 8.2 | 8.3 | | kg |
| Embodiment | | ½ H | 5.9 | 7.2 | 7.2 | 60° | 11.8 |
| 2 | | ¾ H | 7.2 | 8.2 | 8.3 | | kg |

TABLE 1-continued

| | Diagonal size | Position for Thickness Measurement | S | L | D | α | Funnel Weight |
|---|---|---|---|---|---|---|---|
| Embodiment | | ½ H | 5.9 | 7.2 | 7.2 | 16° | 10.7 |
| 3 | | ¾ H | 7.2 | 8.2 | 8.3 | | kg |
| Embodiment | 36 inches | ½ H | 7.7 | 8.4 | 8.3 | 60° | 16.4 |
| 4 | | ¾ H | 9.0 | 9.4 | 9.5 | | kg |
| Embodiment | | ½ H | 7.0 | 8.4 | 8.3 | 60° | 16.0 |
| 5 | | ¾ H | 8.4 | 9.4 | 9.5 | | kg |
| Embodiment | | ½ H | 7.0 | 8.4 | 8.3 | 16° | 15.3 |
| 6 | | ¾ H | 8.4 | 9.4 | 9.5 | | kg |
| Comparative | 32 inches | ½ H | 6.5 | 7.2 | 7.6 | | 12.0 |
| Example 1 | | ¾ H | 7.8 | 8.2 | 8.7 | | kg |
| Comparative | 36 inches | ½ H | 7.7 | 8.4 | 8.8 | | 17.0 |
| Example 2 | | ¾ H | 9.0 | 9.4 | 9.9 | | kg |

TABLE 2

| 32 inches | Embodiment 1 | Embodiment 2 | Embodiment 3 | Comparative Example 1 |
|---|---|---|---|---|
| UL1418 Ball Impact Method | Out of Specification 0/10 | Out of Specification 0/10 | Out of Specification 0/10 | Out of Specification 0/10 |
| UL1418 Missile Method | Out of Specification 0/10 | Out of Specification 0/10 | Out of Specification 0/10 | Out of Specification 0/10 |

TABLE 3

| 36 inches | Embodiment 4 | Embodiment 5 | Embodiment 6 | Comparative Example 2 |
|---|---|---|---|---|
| UL1418 Ball Impact Method | Out of Specification 0/10 | Out of Specification 0/10 | Out of Specification 0/10 | Out of Specification 0/10 |
| UL1418 Missile Method | Out of Specification 0/10 | Out of Specification 0/10 | Out of Specification 0/10 | Out of Specification 0/10 |

According to the present invention, the weight of the funnel for use in cathode ray tubes can be reduced with no deterioration in mechanical strength or moldability.

What is claimed is:

1. A funnel for a cathode ray tube comprising:

a yoke portion at a smaller open-end side and a body portion at a larger open-end side, an arbitrary transverse cross-section (Ph) perpendicular to a center line X of said body portion being substantially rectangular having a major axis L, a minor axis S and a diagonal axis D, wherein, with said transverse cross-section (Ph) being virtually divided into four 90°-quadrants around said center line X, a thickness distribution at least in one of said quadrants is provided by $|T(Dh)-T(Lh)|\leqq 0.3$ mm and $T(Dh)>T(Sh)$, $|T(\theta h)-T(Lh)|0.3$ mm and $|T(\theta h)-T(Dh)|\leqq 0.3$ mm in a $0°\leqq\theta\leqq d°$ region, and $|T(\theta h)-T(Sh)|\leqq 0.3$ mm in a $(d+\alpha)°\leqq\theta\leqq 90°$ region where $0°<\alpha<(90-d)°$;

where $\theta(0°\leqq\theta\leqq 90°)$ is an angle measured from said major axis L in each quadrant, T(Lh) is a thickness of a region on said major axis L ($\theta=0°$), T(Sh) is a thickness of a region on said minor axis S ($\theta=90°$), T(Dh) is a thickness of a region on said diagonal axis D($\theta=d°$), and $T(\theta h)$ is a thickness of a region at an arbitrary angle ($\theta$).

2. The funnel for a cathode ray tube according to claim 1, wherein an inequality of T(Dh)−T(Sh)≧0.8 mm is satisfied.

3. The funnel for a cathode ray tube according to claim 2, wherein the thickness in the d°≦θ≦(d +a)° region decreases gradually from T(Dh) to T(Sh).

4. The funnel for a cathode ray tube according to claim 2, wherein said α lies in a 10°≦α<(90−d)° range.

5. The funnel for a cathode ray tube according to claim 2, wherein said α lies in a 10°≦α<(90−d)° range.

6. The funnel for a cathode ray tube meeting the relations described in claim 2 in said four quadrants.

7. The funnel for a cathode ray tube according to claim 1, wherein the thickness in the d°≦θ≦(d+α)° region decreases gradually from T(Dh) to T(Sh).

8. The funnel for a cathode ray tube according to claim 7, wherein said α lies in a 10°≦α<(90−d)° range.

9. The funnel for a cathode ray tube meeting the relations described in claim 8 in said four quadrants.

10. The funnel for a cathode ray tube meeting the relations described in claim 7 in said four quadrants.

11. The funnel for a cathode ray tube according to claim 7, wherein said α lies in a 10°≦α<(90−d)° range.

12. The funnel for a cathode ray tube according to claim 1, wherein said α lies in a 10°≦α<(90−d)° range.

13. The funnel for a cathode ray tube meeting the relations described in claim 12 in said four quadrants.

14. The funnel for a cathode ray tube meeting the relations described in claim 1, in said four quadrants.

* * * * *